United States Patent
Kurimura et al.

(10) Patent No.: US 7,206,122 B2
(45) Date of Patent: Apr. 17, 2007

(54) OPTICAL COMMUNICATION-USE WAVELENGTH CONVERSION DEVICE

(75) Inventors: Sunao Kurimura, Tsukuba (JP); Masaki Harada, Tokyo (JP)

(73) Assignee: National Institute for Materials Science, Tsukuba-shi, Ibaraki (JP)

( * ) Notice: Subject to any disclaimer, the term of this patent is extended or adjusted under 35 U.S.C. 154(b) by 61 days.

(21) Appl. No.: 10/523,170

(22) PCT Filed: Sep. 18, 2003

(86) PCT No.: PCT/JP03/11883

§ 371 (c)(1),
(2), (4) Date: Mar. 11, 2005

(87) PCT Pub. No.: WO2004/027511

PCT Pub. Date: Apr. 1, 2004

(65) Prior Publication Data

US 2005/0213193 A1    Sep. 29, 2005

(30) Foreign Application Priority Data

Sep. 20, 2002    (JP)    ............................ 2002-276002

(51) Int. Cl.
    *G02F 1/355*    (2006.01)
    *G02F 1/365*    (2006.01)

(52) U.S. Cl. ................ 359/326; 359/332; 385/122

(58) Field of Classification Search ........ 359/326–332, 359/341.1; 385/122
See application file for complete search history.

(56) References Cited

U.S. PATENT DOCUMENTS

| | | | | |
|---|---|---|---|---|
| 5,270,853 A | * | 12/1993 | Bashkansky et al. | ........ 359/326 |
| 5,836,073 A | * | 11/1998 | Mizuuchi et al. | ............. 29/600 |
| 6,347,174 B1 | * | 2/2002 | Onishi et al. | ................ 385/122 |
| 6,831,775 B2 | * | 12/2004 | Matsushita et al. | ......... 359/326 |

FOREIGN PATENT DOCUMENTS

| | | |
|---|---|---|
| JP | 10-068976 A | 3/1998 |
| JP | 11-212128 A | 8/1999 |
| JP | 2002-122898 A | 4/2002 |

OTHER PUBLICATIONS

Babsail et al, "Second-Harmonic Generation In Ion-Implanted Quartz Planar Waveguides", Applied Physics Letters, vol. 59, No. 4, Jul. 22, 1991, pp. 384-386.*

(Continued)

*Primary Examiner*—John D. Lee
(74) *Attorney, Agent, or Firm*—Frishauf, Holtz, Goodman & Chick, P.C.

(57) ABSTRACT

A wavelength converter that is used in an optical communication system utilizing wavelength multiplexing. The wavelength converter has a quasi-phase matched quartz crystal that has a second-order nonlinear effect, and a light coupling device that mixes the signal light and control light and inputs this mixed light into the quasi-phase matched quartz crystal. The wavelength converter also has quartz type optical fibers between the light coupling device and the quasi-phase matched quartz crystal. The mode diameter of the quartz type optical fibers is substantially the same as the mode diameter of the optical waveguide.

6 Claims, 3 Drawing Sheets

OTHER PUBLICATIONS

Tadashi Kurimura et al, Shigai Hacho Henkan o Mezashita Giji Iso Seigo Suishi, Oyo butsuri, vol. 69, No. 5, pp. 548-552 (2000).
Tadashi Kurimura et al, Shigai Hacho Henkan o Mezashita Giji Iso Seigo Suishi, Oyo butsuri, *Applied Physics*, vol. 69, No. 5, pp. 548-552 (2000).

C. Q. Xu et al, Wavelength conversions—1.5 μm by difference frequency generation in periodically doman-inverted $LiNbO_3$ channel waveguides, *App. Physics Lett.*, vol. 63, No. 9 pp. 1170-1172 (Aug. 1993).

* cited by examiner

OPTICAL COMMUNICATION-USE WAVELENGTH CONVERSION DEVICE

This application is the United States national phase application of International Application PCT/JP2003/011883 filed Sep. 18, 2003.

TECHNICAL FIELD

The present invention relates to an optical wavelength converter which is used in an optical communication system that utilizes wavelength multiplexing.

BACKGROUND ART

In the field of optical communications, Dense Wavelength Division Multiplexing (DWDM) in which signals are multiplexed by being carried on a plurality of different wavelengths are generally used in order to handle added communications capacity. In such a field, optical wavelength conversion between the respective nodes of the network will be indispensable in the future for the effective utilization of the limited wavelength resources of the respective nodes. In the past, furthermore, wavelength multiplex communications have been performed only in the C band; however, there are prospects for the use of other wavelength bands as a result of the increase in communication capacity. Accordingly, a need has arisen for inter-band wavelength conversion between the respective nodes of such networks.

In conventional wavelength conversion techniques, wavelength conversion is performed after the optical signal is temporarily converted into an electrical signal; then, the signal is again converted into an optical signal. In such a method, however, the following problem arises: namely, the conversion speed is slow, and a conversion device is required for each wavelength. Accordingly, this method is disadvantageous in terms of integration and cost.

In recent years, on the other hand, there has been active research concerning optical devices that are capable of a direct wavelength conversion from light to light. Such a method has extremely great merit in that conversion can be accomplished without losing phase information of the light, and in that a simple system can be constructed that is capable of extremely high-speed conversion compared to systems in which wavelength conversion is performed via electrical signals.

Currently, a number of methods for the direct conversion of light have been proposed. First, a wavelength conversion method using mutual gain modulation by means of a compound semiconductor amplifier has been considered. In the case of this method, however, the following problem arises: namely, the wavelength conversion band is limited to the interior portion of the C band within the gain range of the semiconductor, so that inter-band wavelength conversion is impossible.

Furthermore, a method using nondegenerate four-wave light mixing in an optical fiber has also been proposed. In this method, wavelength conversion in the optical communication wavelength band can be accomplished by nondegenerate four-wave light mixing utilizing the third-order nonlinearity of the gain medium. In this method, however, an optical fiber with a length of several tens to several hundreds of meters is necessary in order to improve the conversion efficiency. The possibility that the phase matching conditions will differ from place to place in such a long fiber is large, so that there are problems in terms of wavelength stability. Moreover, the following problem also arises: namely, since the wavelength bandwidth that can be converted is inversely proportional to the length of the fiber, the conversion band is limited.

Moreover, a method using a quasi-phase matching nonlinear optical element has also been proposed. The advantage of wavelength conversion using a quasi-phase matching nonlinear optical element is that the wavelength conversion of numerous wavelengths at one time can be accomplished without noise in a broad wavelength band. Accordingly, at the current point in time, the direct wavelength conversion of light using a quasi-phase matching nonlinear optical element would appear to be the most powerful method in Dense Wavelength Division Multiplexing (DWDM).

A quasi-phase matching nonlinear optical element will be described below. The generation of light of different frequencies, e.g., second harmonic generation (SHG), sum frequency generation (SFG), difference frequency generation (DFG), or the like, can be accomplished by causing laser light to be incident on a second-order nonlinear optical medium that does not have the center symmetry.

However, in order to allow high-efficiency wavelength conversion that can stand up to practical use, it is necessary that the phases of the respective wavelengths satisfy certain matching conditions. Methods for causing these matching conditions to be satisfied include a method utilizing the birefringence of a crystal, and a method in which the sign of the nonlinear constant of a crystal is periodically inverted. The latter method is called quasi-phase matching (QPM).

Difference frequency generation is a technique in which light of a frequency $\omega1$ and light of a frequency $\omega2$ are caused to be incident, and are converted into a difference frequency $\omega3(=\omega1-\omega2)$. In a case where the nonlinear medium has a nonlinear-constant-inverted structure with a period of $\Lambda$, it is necessary to satisfy the quasi-phase matching condition determined by the following equation:

$$\beta1-\beta2-\beta3-2\pi m/\Lambda=0$$

Here, m is an integer, $\beta1$ and $\beta2$ are respectively the propagation constants of the light of frequency $\omega1$ and light of frequency $\omega2$ in the nonlinear medium, and $\beta3$ is the propagation constant of the light of frequency $\omega3$ in the nonlinear medium.

A method in which a high electric field is applied to a ferroelectric substance which has spontaneous polarization, so that a periodic polarization inversion is performed, has been used as a method for inverting the nonlinear constants. Lithium niobate ($LiNbO_3$) and lithium tantalate ($LiTaO_3$), etc., are known as typical examples of such substances.

Wavelength conversion in optical communications can be accomplished by difference frequency generation using this quasi-phase matching nonlinear optical element. For example, wavelength conversion in the vicinity of a wavelength of 1.5 μm used in optical communications is accomplished as described in a paper by C. Q. Xu, et al., titled "Wavelength conversions 1.5 m by difference frequency generation in periodically domain inverted $LiNbO_3$ channel wave guides" (Appl. Phys. Lett. Vol. 63 (1993), pp. 1170–1172). Furthermore, there has also been extensive research on inter-band optical wavelength conversions.

Wavelength conversion in optical communications utilizing difference light prior to wavelength conversion are respectively designated as $\lambda_{in}$ an $\omega_{in}$. The wavelength and frequency of the light following wavelength conversion are respectively designated as $\lambda_{out}$ and $\omega_{out}$. Furthermore, another type of light that is required for difference frequency generation is called "pump light" (control light); the wavelength and frequency of this light are respectively designated as $\lambda_{pump}$ and $\omega_{pump}$. A polarization inversion structure with a period of $\Lambda$ is built in so that the phase matching conditions are satisfied by $\omega_{out}=\omega_{pump}-\omega_{in}$.

For example, in cases where a C-L band conversion is performed using lithium niobate, if the wavelength $\lambda_{pump}$ of the pump light is set so that $\lambda_{pump}=0.785$ µm, then $\lambda_{in}=1.53$ to 1.57 µm, $\lambda_{out}=1.57$ to 1.61 µm, and the period $\Lambda$ is approximately 19.5 µm. In difference frequency generation, in a case where the wavelength is shown in the horizontal axis and the intensity of the light is shown on the vertical axis as is shown in FIG. 1, the wavelength prior to conversion and the wavelength following conversion form mirror images about the axis of the pump light wavelength. Specifically, in a case where the wavelengths prior to conversion are $\lambda_1, \lambda_2, \ldots, \lambda_N$, the wavelengths following conversion are respectively $\lambda_1', \lambda_2', \ldots, \lambda_N', \lambda_n'$, and in a case where the wavelengths prior to conversion are $\lambda_1', \lambda_2', \ldots, \lambda_N'$, the wavelengths following conversion are respectively $\lambda_1, \lambda_2, \ldots, \lambda_N$. Accordingly, the wavelength conversion of numerous wavelengths at one time can be accomplished without noise, and without the signals prior to wavelength conversion interfering with each other following conversion.

However, the following problems arise in a quasi-phase matching nonlinear optical element using a ferroelectric crystal. Namely, in the case of lithium niobate and lithium tantalate, temporal damage in the refractive index caused by the photorefractive effect (optical damage) is a problem. In this effect, the carrier is excited and diffused from impurities that are admixed in the crystal growth stage, so that a non-uniform distribution is produced. As a result, an internal electric field is generated, and a variation in the refractive index is generated via the electro-optical effect. This light-induced variation in the refractive index is also called optical damage; in a quasi-phase matching device, this variation causes a deviation from the phase matching conditions, and therefore causes a drop in conversion efficiency. Accordingly, this is an important factor limiting the performance.

A method in which the crystal temperature is maintained at 100° C. or higher is known as a method for reducing optical damage. In order to accomplish this, it is necessary to control the temperature by means of a Peltier element, etc. However, this method suffers from numerous problems, e.g., a device for heat radiation is necessary, and simple system cannot be constructed. Accordingly, this method is not suitable for use in practical optical devices.

On the other hand, crystals that are relatively resistant to optical damage, e.g., MgO-doped crystals and stoichiometric crystals, are being developed. In such materials, however, there are problems in terms of quality, availability, cost, difficulty of polarization inversion and the like, so that these materials involve problems in terms of practical use at the present time.

Furthermore, ordinary lithium niobate and the like are mass-produced as materials for use in high-frequency electrical signal filters; however, a higher-quality crystal (optical grade crystal) is required for use in optical applications. Such optical grade crystals can only be produced in small quantities; accordingly, there are problems in terms of cost, availability, etc.

Furthermore, strict conditions with respect to the ambient temperature are also a problem in lithium niobate and lithium tantalate. When the ambient temperature varies, the refractive index of the crystal also varies; as a result, the phase matching conditions cannot be satisfied, so that the wavelength conversion efficiency shows an abrupt decrease. In the case of lithium niobate, for example, a variation of a few degrees in the ambient temperature results in a deviation from the phase matching conditions. Accordingly, temperature control is required in order to maintain the temperature of the crystal within a few degrees even if the ambient temperature should vary. Consequently, the construction of the system is complicated.

Furthermore, these elements also suffer from problems in terms of the ability to couple with quartz type optical fibers. Currently, quartz type optical fibers are widely used as a medium for guiding light in optical communications. Moreover, optical waveguide structures based on the proton exchange method or the like have been manufactured and used for the purpose of increasing the wavelength conversion efficiency by a strong shutting in of the light in a polarization inversion element consisting of such lithium niobate or the like. In this case, the mode diameter of the optical waveguide is approximately 4 µm, while the mode diameter of a quartz type fiber is approximately 10 µm. Accordingly, it is impossible to achieve complete matching of both optical modes, so that a coupling loss of approximately 2 dB is inevitably generated when the optical waveguide and optical fiber are coupled.

The present invention was devised in light of such circumstances; the object of the present invention is to provide a wavelength converter for use in optical communications which has little problem of optical damage, which can be used in a broad range of temperatures, and which also shows good coupling characteristics with quartz type optical fibers.

DISCLOSURE OF THE INVENTION

The first invention that is used to achieve the object described above is a wavelength converter that is used in an optical communication system utilizing wavelength multiplexing, this wavelength converter for use in optical communications being characterized by the fact that the converter has a quasi-phase matched quartz crystal that has a second-order nonlinear effect, and a light coupling device that mixes the signal light and control light and inputs this mixed light into the quasi-phase matched quartz crystal.

In this invention, the signal light and control light (pump light) are mixed and input into the quasi-phase matched quartz crystal, and light that is subjected to a wavelength conversion is output from the quasi-phase matched quartz crystal by the same principle as that utilized in cases where lithium niobate or lithium tantalate is used as a wavelength conversion element.

In this invention, a quasi-phase matched quartz crystal that has a nonlinear effect is used as a wavelength conversion element. Such a quasi-phase matched quartz crystal is already publicly known, and a manufacturing method that is completely different from conventional methods, in which a periodic inversion structure of spontaneous polarization is realized by creating a periodic twin structure by applying stress in the vicinity of the α-β phase transition temperature of quartz ($SiO_2$) (which is a paraelectric material) is reported by S. Kurimura in the May 2000 issue of the Journal of the Japan Society of Applied Physics. This is a method in which a quasi-phase matched crystal based on quartz is manufactured by utilizing Dauphine twin crystals of quartz, and periodically inverting the sign of the nonlinear optical constant $d_{11}$.

If the wavelength $\lambda_{pump}$ of the pump light is set at $\lambda_{pump}=0.785$ µm, then the period of the quartz twin structure in a case where a C-L inter-band wavelength conversion in which $\lambda_{in}=1.53$ to 1.57 µm and $\lambda_{out}=1.57$ to 1.61 µm is approximately 70 µm.

Quartz is a chemically and mechanically stable crystal, and can be mass-produced by the hydrothermal synthesis method, so that this crystal is inexpensive and readily available. Furthermore, quartz is widely used in optical applications, e.g., wavelength plates and optical low-pass filters, so that high-quality quartz is produced in large quantities. Moreover, in regard to the incidence of intense laser light as well, the damage threshold value of quartz is extremely high among optical crystals (approximately 400 GW/cm$^2$). Furthermore, quartz is a crystal that shows no hygroscopic nature and that can be used over a long period of time.

In addition, the optical damage caused by the photorefractive effect in ferroelectric crystals such as lithium niobate is not seen in quartz. Accordingly, it is possible to overcome the deviation in the phase matched wavelength and the drop in the conversion efficiency caused by variation in the refractive index that are problems in conventional crystals that are capable of quasi-phase matching.

Furthermore, as is described by S. Kurimura in the May 2000 issue of the Journal of the Japan Society of Applied Physics, quartz possesses the special feature of an extremely broad bandwidth of permissible operation temperatures. For example, in the case of a C-L inter-band wavelength conversion, the temperature bandwidth is 187° C. in an element with a length of 1 cm, which is far broader than the range of approximately 12° C. in the case of conventional lithium niobate. Accordingly, there is absolutely no need for a temperature adjustment mechanism in order to maintain the temperature at a constant value against the varying ambient temperature, so that a system that is extremely practical as an optical communication device can be constructed.

Furthermore, the refractive indices of glass quartz and quartz crystal are extremely close; accordingly, in cases where a quasi-phase matched quartz crystal is formed into a waveguide, it may be predicted that the mode diameter will be similar to that of a quartz type optical waveguide. The coupling efficiency of current quartz type optical waveguides and quartz type optical fibers is approximately 0.5 dB; a similar coupling efficiency is also obtained in cases where a quasi-phase matched quartz crystal is formed into an optical waveguide.

Thus, in this invention, since a quasi-phase matched quartz crystal is used as a wavelength conversion element, a wavelength converter for use in optical communications that overcomes the drawbacks of conventional lithium niobate can be obtained.

The second invention that is used to achieve the object described above is the first invention, which is characterized by the fact that the converter has a fiber amplifier that amplifies the output light from the quasi-phase matched quartz crystal.

The nonlinear constant d of a quartz crystal is $d_{11}$=0.3 pm/V, which is smaller than the nonlinear constant $d_{33}$ (=27 pm/V) of lithium niobate. Furthermore, the wavelength conversion efficiency is proportional to the square of the nonlinear constant. Accordingly, in the case of the same crystal length, the conversion efficiency is lower than that of quasi-phase matched lithium niobate by approximately 39 dB. In this invention, since the converter has a fiber amplifier that amplifies the output light from the quasi-phase matched quartz crystal, compensation can be made for this drop in the conversion efficiency. The fiber amplifier has a gain of approximately 30 to 40 dB, and is a device that is widely used in optical communications and that is capable of low-noise amplification. The fiber amplifier may have a single-stage or two-stage construction.

The third invention that is used to achieve the object described above is the first or second invention, which is characterized by the fact that the converter has an optical filter that cuts the control light and the signal light that remains without being subjected to an optical conversion, on the emission side of the quasi-phase matched quartz crystal.

Since the wavelength conversion efficiency in the wavelength conversion element is not 100%, unconverted signal light and control light are contained in the light that is output. In this invention, such unconverted signal light and control light can be cut by the optical filter.

The fourth invention that is used to achieve the object described above is any of the first through third inventions, which is characterized by the fact that the converter has fiber collimators disposed before and after the quasi-phase matched quartz crystal.

Quasi-phase matched quartz crystals include crystals in which optical waveguides are formed before and after the crystal. In the case of such crystals, the light from the optical fiber is mode-matched by a V groove. However, in cases where a quasi-phase matched quartz crystal in which such optical waveguides are not formed is used, the conversion efficiency drops if the light is diffused in the quasi-phase matched quartz crystal. In this invention, as a result of the installation of fiber collimators before and after the quasi-phase matched quartz crystal, a wavelength conversion is performed with the light that is input into the quasi-phase matched quartz crystal set as parallel light, and the light that is generated from the quasi-phase matched quartz crystal is received by the optical fiber with this light focused inside the optical fiber. Thus, the diffusion of light inside the quasi-phase matched quartz crystal can be prevented, so that a wavelength conversion can be performed at a high conversion efficiency.

The fifth invention that is used to achieve the object described above is any of the first through fourth inventions, which is characterized by the fact that the converter has means for controlling the direction of polarization of the light that is input into the quasi-phase matched quartz crystal.

Since the nonlinear constant of $d_{11}$ is used in the quasi-phase matched quartz crystal, a polarization dependence is observed. On the other hand, the signal light in the optical fibers is generally random elliptically polarized light. Accordingly, the following problem arises: namely, the wavelength conversion efficiency varies according to the state of polarization at the time of incidence on the quasi-phase matched quartz crystal.

In this invention, since there are means for controlling the direction of polarization of the light that is input into the quasi-phase matched quartz crystal, the direction of polarization of the light can be adjusted to a direction that is desirable for the wavelength conversion of the quasi-phase matched quartz crystal by means of this control means, so that the wavelength conversion efficiency can be increased.

BEST MODE FOR CARRYING OUT THE INVENTION

Working configurations of the present invention will be described below with reference to the figures.

[First Working Configuration]

Figure 1:
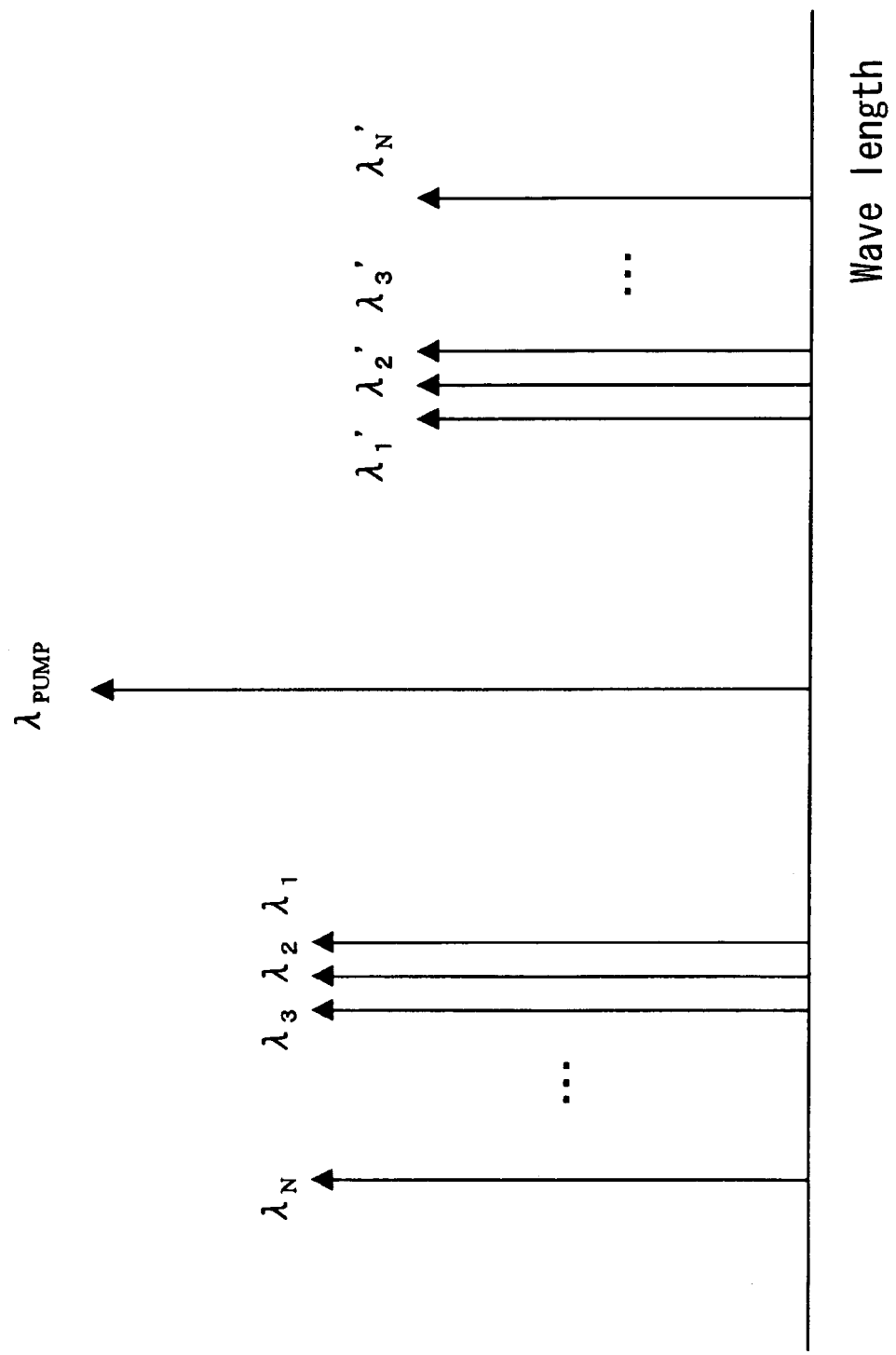
FIG. 1 is a diagram which illustrates difference frequency generation by means of a quasi-phase matching wavelength conversion element.
Figure 2:
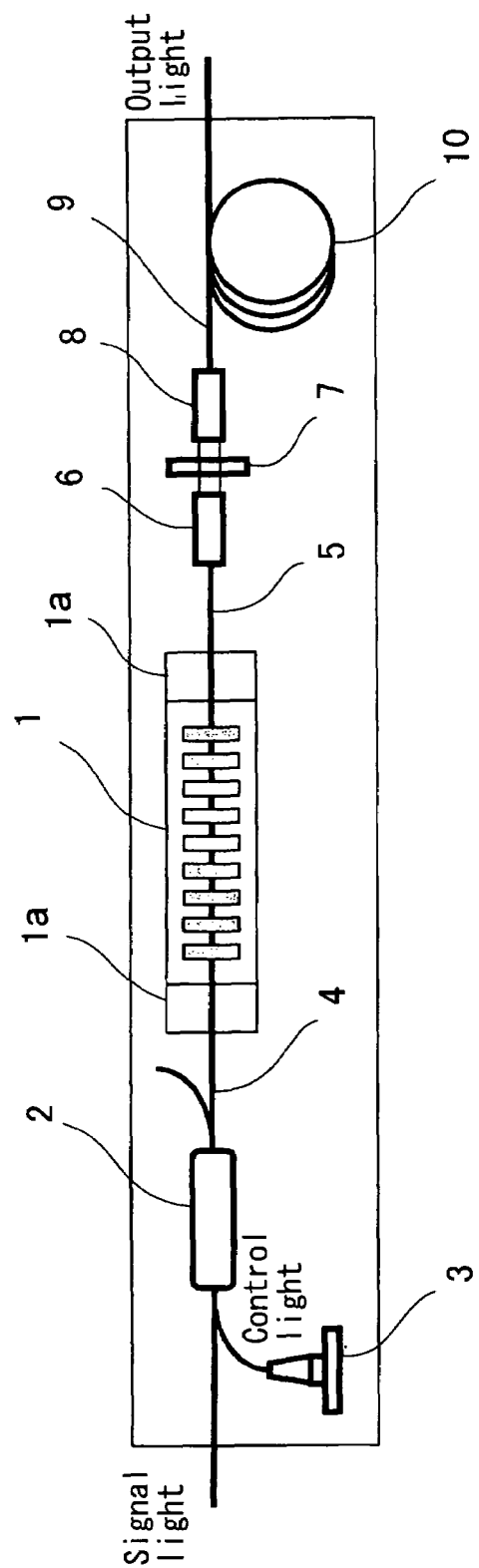
FIG. 2 is a schematic structural diagram which illustrates a WDM wavelength converter constituting a first working configuration of the present invention.

FIG. 2 is a schematic structural diagram which shows a WDM wavelength converter constituting a first working configuration of the present invention. In FIG. 2, an optical waveguide structure is formed in a quasi-phase matched quartz crystal 1, and V grooves 1a are formed before and after this structure. Below, a case in which a C-L inter-band wavelength conversion is performed will be described as an example. In this case, if the wavelength $\lambda_{pump}$ of the control light is set so that $\lambda_{pump}$=0.785 μm, the wave length of the signal light $\lambda_{in}$=1.53 to 1.57 μm, and the wave length of the output light $\lambda_{out}$=1.57 to 1.61 μm. Furthermore, the wavelength bands of the signal light and output light may also be the reverse of the bands described above.

In FIG. 2, the signal light that is guided by the single-mode optical fiber is coupled with control light that is emitted from a laser diode 3 by a WDM coupling device 2. The optical fiber 4 on one end of the WDM coupling device is mode-matched with the optical waveguide of the quasi-phase matched quartz crystal 1 by a V groove 1a. The coupling loss in this case is estimated at 0.5 dB as was described above.

The output light that is generated by the difference frequency generation of the signal light and control light is again guided to the optical fiber 5 from the quasi-phase matched quartz crystal 1 by the other V groove 1a. A fiber collimator 6 is disposed on the other end of this optical fiber 5. The light from the optical fiber 5 is converted into parallel light and is caused to be incident on an optical filter 7. The role of this optical filter 7 is to cut the control light and signal light that remains without being subjected to a wavelength conversion, and to transmit only the output light. The output light is collected by the fiber collimator 8 and input into the optical fiber 9.

The optical fiber 9 is connected to the fiber amplifier 10. As was described above, in cases where a quasi-phase matched quartz crystal is used as a wavelength conversion element, the wavelength conversion efficiency is lower than that of lithium niobate as a result of the small nonlinear constant. In the present working configuration, the fiber amplifier 10 is installed in order to compensate for this. The light that has been subjected to a wavelength conversion is amplified by the fiber amplifier 10, and is output as output light.

[Second Working Configuration]

Figure 3:
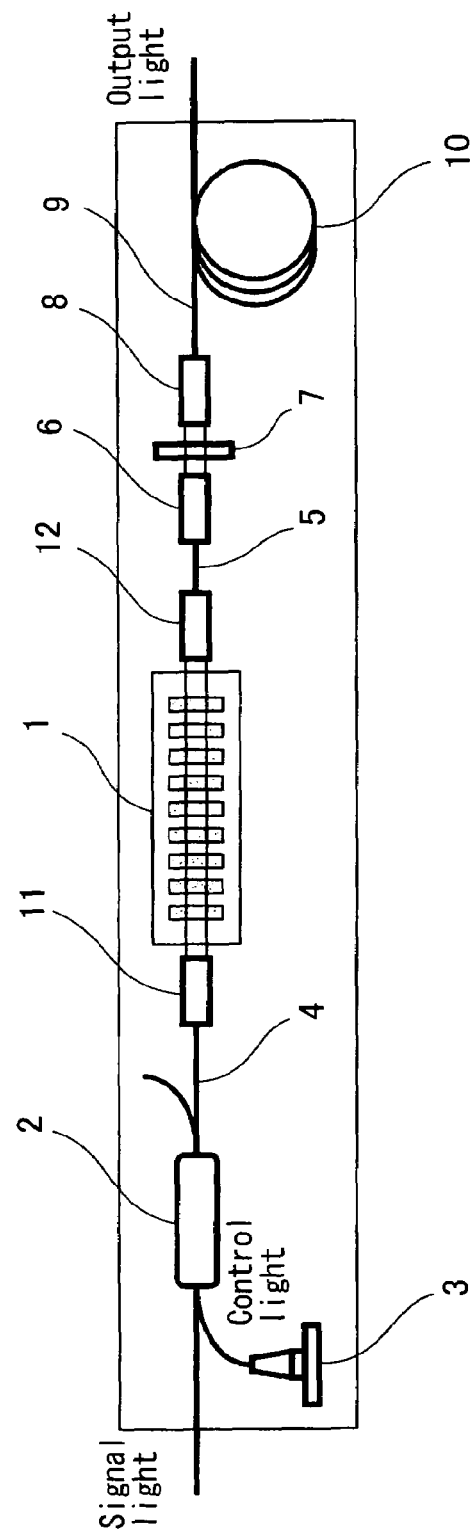
FIG. 3 is a schematic structural diagram which illustrates a WDM wavelength converter constituting a second working configuration of the present invention.

FIG. 3 is a schematic structural diagram which shows a WDM wavelength converter constituting a second working configuration of the present invention. As in the case of the first working configuration, a case in which a C-L inter-band wavelength conversion is performed will be described as an example. In FIG. 3, constituent elements that are the same as the constituent elements shown in FIG. 2 are labeled with the same symbols, and a description of such elements is omitted.

There is no difference between the basic operation of this working configuration and that of the first working configuration. However, in the quasi-phase matched quartz crystal 1 shown in FIG. 3, an optical waveguide structure is not formed. Accordingly, in this working configuration, signal light and control light are caused to be incident on the quasi-phase matched quartz crystal 1 as parallel light by the fiber collimator 11 so that difference frequency generation is performed, and the output light generated as a result is collected in the optical fiber 6 by the fiber collimator 12. The remaining construction is the same as that of the first working configuration shown in FIG. 2.

[Third Working Configuration]

A third working configuration of the present invention will be described below. In this working configuration, the main body part of the wavelength converter for use in optical communications is the same as that shown in FIGS. 2 and 3. However, this working configuration differs from the preceding working configurations in that means for controlling the direction of polarization of the signal light that is coupled into the quasi-phase matched quartz crystal 1 are provided in front of this main body part.

In the quasi-phase matched quartz crystal 1, since the nonlinear constant of $d_{11}$ is used, a polarization dependence is observed. On the other hand, the signal light in the optical fibers is generally random elliptically polarized light. Accordingly, the following problem arises: namely, the conversion efficiency varies according to the state of polarization at the time of incidence on the quasi-phase matched quartz crystal.

In this working configuration, this problem is solved by installing a mechanism that converts the signal light into a linearly polarized light. Generally, if a quarter-wavelength plate or half-wavelength plate is combined and rotated, the elliptically polarized light can be converted into linearly polarized light that has an arbitrary polarization direction. In this working configuration, an elimination of the polarization dependence of the wavelength conversion efficiency can be realized by inserting such a mechanism into the light path before the point at which the signal light is incident on the WDM coupling device.

Furthermore, as is described in a reference by C. Q. Xu, H. Okayama and T. Kamijoh: Opt. Rev. 4, (1997), p. 546, a method for eliminating polarization dependence which combines a polarizing beam splitter and a wavelength plate may also be used. Alternatively, a method for eliminating polarization dependence by embedding a wavelength plate in the optical device as described in Japanese Patent Application Kokai No. H10-68976 may also be used.

The invention claimed is:

1. A wavelength converter that is used in an optical communication system utilizing wavelength multiplexing, this wavelength converter for use in optical communications being characterized by the fact that the converter has a quasi-phase matched quartz crystal that has a second-order nonlinear effect, and a light coupling device that mixes the signal light and control light and inputs this mixed light into the quasi-phase matched quartz crystal, wherein the wavelength converter further comprises quartz type optical fibers between the light coupling device and the quasi-phase matched quartz crystal as well as after the quasi-phase matched quartz crystal, the quasi-phase matched quartz crystal comprises an optical waveguide with a periodically inverted sign of the nonlinear optical constant $d_{11}$, and the mode diameter of the quartz type optical fibers is substantially the same as the mode diameter of the optical waveguide.

2. The wavelength converter for use in optical communications according to claim 1, which is characterized by the fact that the converter has a fiber amplifier that amplifies the output light from the quasi-phase matched quartz crystal.

3. The wavelength converter for use in optical communications according to claim 1, which is characterized by the fact that the converter has an optical filter that cuts the control light and the signal light that remains without being subjected to an optical conversion, on the emission side of the quasi-phase matched quartz crystal.

4. The wavelength converter for use in optical communications according to claim 1, which is characterized by the fact that the converter has fiber collimators disposed before and after the quasi-phase matched quartz crystal.

5. The wavelength converter for use in optical communications according to claim 1, which is characterized by the fact that the converter has means for controlling the direction of polarization of the light that is input into the quasi-phase matched quartz crystal.

6. The wavelength converter for use in optical communications according claim 1, wherein the period is approximately 70 μm, the wavelength of the control light is 0.785 μm, and the wavelength range of the signal light is 1.53–1.57 μm.

* * * * *